(12) United States Patent
Mohamed et al.

(10) Patent No.: US 7,843,512 B2
(45) Date of Patent: Nov. 30, 2010

(54) IDENTIFYING KEY VIDEO FRAMES

(75) Inventors: Ibrahim M Mohamed, Kayalpatnam (IN); Lokesh R Boregowda, Bangalore (IN)

(73) Assignee: Honeywell International Inc., Morristown, NJ (US)

(*) Notice: Subject to any disclaimer, the term of this patent is extended or adjusted under 35 U.S.C. 154(b) by 1021 days.

(21) Appl. No.: 10/708,905

(22) Filed: Mar. 31, 2004

(65) Prior Publication Data
US 2005/0226331 A1    Oct. 13, 2005

(51) Int. Cl.
*H04N 9/64*    (2006.01)

(52) U.S. Cl. .............. 348/700; 348/699; 375/240.16

(58) Field of Classification Search ............ 375/240.16; 348/700
See application file for complete search history.

(56) References Cited

U.S. PATENT DOCUMENTS

| | | | | |
|---|---|---|---|---|
| 5,635,982 | A * | 6/1997 | Zhang et al. | 348/231.99 |
| 6,252,975 | B1 | 6/2001 | Bozdagi et al. | |
| 6,493,042 | B1 * | 12/2002 | Bozdagi et al. | 348/700 |
| 6,549,643 | B1 * | 4/2003 | Toklu et al. | 382/107 |
| 7,027,513 | B2 * | 4/2006 | Zhang et al. | 375/240.16 |
| 7,184,100 | B1 * | 2/2007 | Wilf et al. | 348/700 |
| 2004/0088723 | A1 * | 5/2004 | Ma et al. | 725/19 |
| 2006/0064716 | A1 * | 3/2006 | Sull et al. | 725/37 |

OTHER PUBLICATIONS

Wayne Wolf, "Key Frame Selection by Motion Analysis," Department of Electrical Engineering Princeton University, 1996, pp. 1228-1231.

Ajay Divakaran, Ragunathan Radhakrishnan and Kadir Peker, "Motion Activity-Based Extraction of Key frames from video shots", Journal on Image/Video storage, Retrieval and multimedia: Image and Video Databases, Mitsubishi Electric Research Laboratories, USA, 2002, pp. I-932-I-935.

Frederic Dufuax, "Key Frame selection to represent a video", Compaq Computer corp., Cambridge Research Lab, 2000, pp. 275-278.

* cited by examiner

*Primary Examiner*—Marsha D Banks Harold
*Assistant Examiner*—Christopher Findley
(74) *Attorney, Agent, or Firm*—Schwegman, Lundberg, & Woessner, P.A.

(57) ABSTRACT

A rate of change of visual content (compared to an adjacent video frame) of a video frame is determined, and the video frame is selected as a key video frame if the rate exceeds a threshold value. In an embodiment, to compute the rate, the motion energy vector magnitude (square of displacement magnitude) of each moved pixel of the current frame is determined, and an average displacement magnitude is determined. The average displacement magnitude may also be used to determine the rate.

27 Claims, 10 Drawing Sheets

IDENTIFYING KEY VIDEO FRAMES

BACKGROUND OF INVENTION

A large number of video frames are often generated by equipment such as video cameras from an area or scene of interest. Such equipment is often used for several purposes such as security surveillance and hazards detection as is well known in the relevant arts.

It is often of interest to identify video frames (from a sequence of large number of frames), which represent the change of visual status in the area (shot) from which the sequence of frames are generated/captured. Such frames of interest are commonly referred to as key video frames.

In one prior approach, the large sequence of frames is first divided into "slots" containing a small number of frames, and a few of the frames in each slot are determined to be key video frames. In one embodiment, the first or last frame in each slot is determined to be a key video frame.

One advantage of such a prior approach is that a key frame is selected periodically (implying at least some information is present in a duration corresponding to a slot). However, sometimes the key frames may not represent only the changes of visual status, and thus unneeded frames may be presented as key video frames. As a result, a large number of frames may be determined as key video frames, necessitating the undesirable key frames to be filtered out by further processing.

In an alternative embodiment, frames (e.g., within a slot noted above) may be selected as key video frames based on the extent of movement of pixels in a current frame compared to a prior frame(s). The extent of such movement(s) may be determined using techniques such as motion vector analysis, in which the extent of movement of each pixel of an image from one position to another is computed.

One problem with such an approach is that small changes (such as a change in background shade or illumination) may cause a frame to be determined as a key video frame, and it may be desirable to ignore such small changes, thereby minimizing the number of key video frames.

SUMMARY OF INVENTION

An aspect of the present invention identifies key frames in a video sequence by determining a rate of change of visual content of each current frame from a corresponding reference frame, and selecting a current frame as a key video frame if the corresponding rate exceeds a threshold value.

In one embodiment, the rate is determined by first determining a displacement magnitude of each moved pixel of a current frame compared to the position in the adjacent frame, and computing a representative magnitude (e.g., mean and variance) of the displacement magnitude for the moved pixels of the adjacent frame.

According to another aspect of the present invention, a current frame is selected as a key video frame if the representative magnitude exceeds a second threshold value. The representative magnitude may be computed as an average of the motion energy vector magnitude of all the moved pixels. In an embodiment, active pixels having a high displacement magnitude (e.g., deviating by more than two times the variance from the mean displacement magnitude of its Gaussian Distribution) only may be used in such a computation.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the left-most digit(s) in the corresponding reference number.

BRIEF DESCRIPTION OF DRAWINGS

The present invention will be described with reference to the accompanying drawings briefly described below.

DETAILED DESCRIPTION

1. Overview

According to an aspect of the present invention, the rate of change of visual content in successive image frames is used in selecting key frames. As a result, only frames with substantial differences may be selected, thereby minimizing the total number of frames selected as key video frames.

In one embodiment, the change of visual content is computed to equal the average motion energy vector magnitude (square of displacement magnitude) of a frame. The rate is then computed based on a difference of such averages for successive frames.

According to another aspect of the present invention, a frame is selected as a key video frame only if the corresponding average motion energy vector magnitude exceeds a pre-determined threshold. By using such additional criteria in the selection of key video frames, the number of frames chosen as key video frames may be further reduced.

According to one more aspect of the present invention, a threshold value ( associated with the rate or average motion energy vector magnitude) used in key frame selection is adjusted dynamically to ensure that at least a minimal number of frames are selected as key video frames even in situations when the image content is changing gradually.

According to yet another aspect of the present invention, when computing the difference of visual content, pixels in the image frame having little displacement magnitude (e.g., deviating by less than two times the variance from the mean displacement value according to a distribution) may be ignored. As a result, the decisions on selection of key frames may be based (at least in some situations) on pixels moving substantially only, thereby leading to better selection of key frames.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
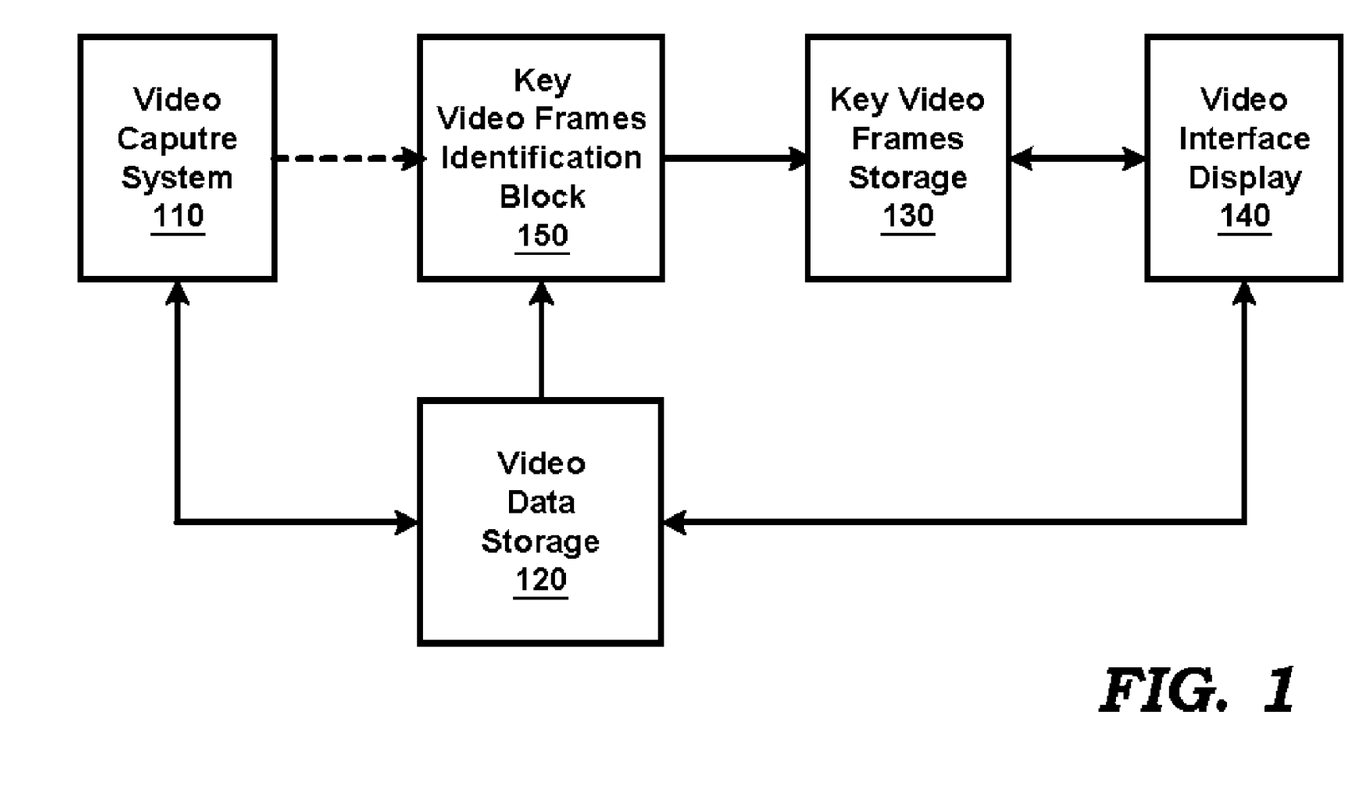
FIG. 1 is a block diagram illustrating an example environment in which the present invention can be implemented.

FIG. 1 shows a block diagram illustrating the use of several aspects of the present invention in an example environment (e.g., in surveillance by a security department). However, various aspects of the present invention can be used in other environments in which key video frames need to be determined from a sequence of video frames.

The block diagram is shown containing video capture system 110, video data storage 120, key video frames storage 130, video interface display 140 and key video frames identification block 150. Each block is described below in detail.

The video capture system 110 captures video frames representing a sequence of images corresponding to a scene or area of interest, and stores the frames in video data storage 120. Each frame generally contains multiple pixels depending on the resolution of capture, with each pixel information being represented using color representation schemes such as RGB or YUV, well known in the relevant arts. The scene/area may be logically viewed as containing multiple objects.

Video interface display 140 displays (from) either all the image frames stored in video data storage 120 or the key video frames stored in key video frames storage 130, for example, according to various user inputs. Some of the features of video interface display 140 are described in further detail in a section below.

Key video frames identification block 150 may receive video frames from video data storage 120, and examine the received frames to identify the key video frames according to various aspects of the present invention as described below with reference to various examples. The identified frames may be stored in key video frames storage 130. Alternatively, the frames determined to be key video frames may be marked as such (as key video frames) within video data storage 120 (and thereby avoid additional storage for key video frames).

In addition, key video frames identification block 150 may examine the frames in real-time (as represented by the dotted connection to video capture system 110) to determine the key video frames. The manner in which key video frames may be identified according to various aspects of the present invention is described below with examples.

3. Method

Figure 2:
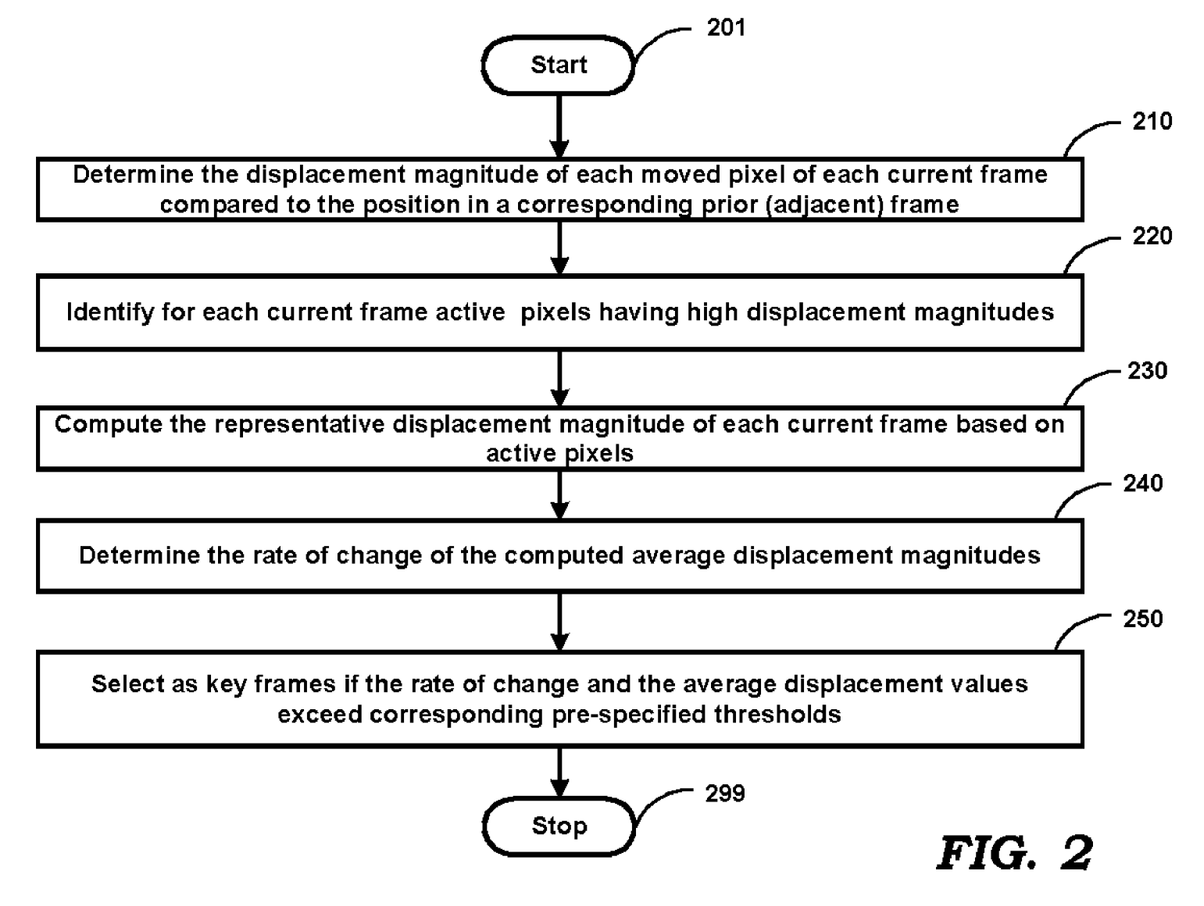
FIG. 2 is a flowchart illustrating the manner in which key frames are extracted from video data according to an aspect of present invention.

FIG. 2 is a flow chart illustrating the manner in which key video frames may be identified according to various aspects of the present invention. The description is provided with respect to FIG. 1 merely for illustration. However, various aspects of the present invention can be implemented in other environments as well, as will be apparent to one skilled in the relevant arts by reading the disclosure provided herein. Such other embodiments are contemplated to be within the scope and spirit of various aspects of the present invention.

The method begins in step 201 and control immediately passes to step 210. In step 210, key video frames identification block 150 determines the displacement magnitude of each moved pixel of each current frame compared to the position in a corresponding prior frame. It may be appreciated that the displacement magnitudes represent a change of visual content of a frame with respect to a previous frame. Such identification of moved pixels and computation of magnitude of change could be performed using one of several known approaches. An example approach to determine such displacement magnitude is described in a section below in further detail.

It should be appreciated that the prior frame represents an example reference frame used for comparison. However, other frames may also be used as a reference frame, depending on the considerations suitable for specific environments. The corresponding implementations are also contemplated to be covered by various aspects of the present invention.

In step 220, key video frames identification block 150 identifies pixels having high displacement magnitudes for each current frame. In an example embodiment described below, the displacement magnitudes follow a Guassian distribution, and only pixels deviating by more than two times the standard deviation from the mean value of the distribution are considered as pixels of interest. The remaining pixels are ignored for the purpose of computations of steps 230 and 240 described below.

In step 230, key video frames identification block 150 computes a representative (e.g., average, median) displacement magnitude for each frame based on displacement magnitudes from pixels of interest. In an embodiment, the square of displacement magnitude (commonly referred to as the "motion vector energy") is normalized to a value of 1, and steps 220, 230 and 240 are performed on the normalized motion vector energy values.

In step 240, key video frames identification block 150 determines the rate of change of the computed average displacement magnitudes for successive frames. An example approach for computation of the rate of change of computed average displacement magnitude is described in a section below in further detail.

In step 250, key video frames identification block 150 selects as key frames, the video frames for which the rate of change and the average displacement values exceed corresponding pre-specified thresholds. An example approach for such identification is described in a section below in further detail. The flow chart ends in step 299. The description is continued with reference to example implementation of some of the above-described steps.

4. Computation of Displacement Magnitude of Each Moved Pixel in a Frame

In one embodiment, key video frames identification block 150 first identifies the pixels that have moved in a current frame (compared to prior frame) by computing displacement magnitude for each pixel. The, displacement magnitude can be determined using one of several known approaches (e.g., three step search well known in the relevant arts, and described in further detail in a document entitled, "Displacement Estimation by Hierarchical Block Matching—proc. SPIE Conference on Visual Communication and Image Processing, Vol 1001, pp. 942-951, January 1988,", by M. Bierling). The manner in which magnitude of displacement can be determined is described below with an example.

Figure 3A:
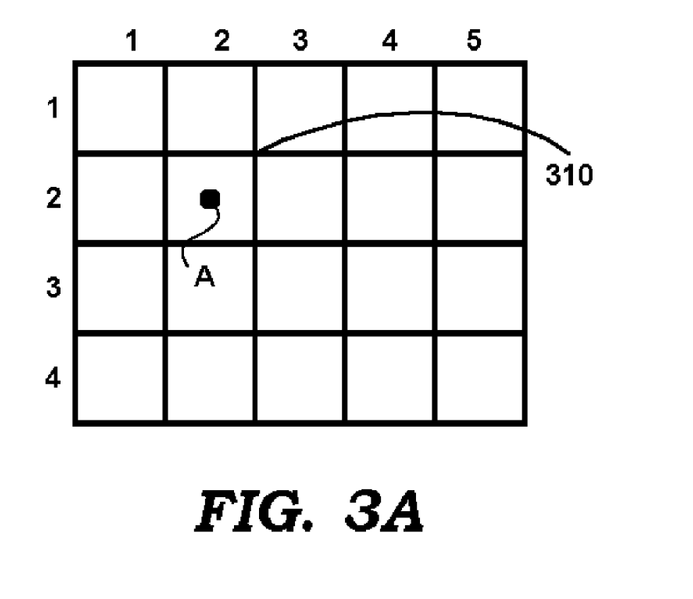
FIGS. 3A and 3B together illustrate the manner in which the displacement magnitude of each pixel may be determined.
Figure 3B:
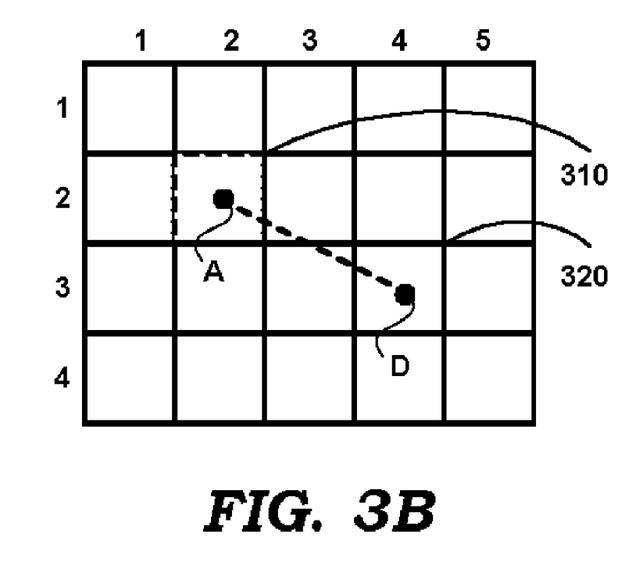

FIGS. 3A and 3B contain diagrams together illustrating the manner in which displacement magnitude can be computed for an example pixel (once it is determined that the pixel has moved using techniques such as those described above). In particular, FIG. 3A is shown containing pixel 310 (having center at location A and shown filled with dots) of a previous frame, and the same pixel is shown moved to 320 (also shown filled with dots) in FIG. 3B. The center of the pixel at 320 is shown as point D (in the current frame). Merely for understandability, pixel 310 is shown in FIG. 3B as well, but with vertical lines to represent that the pixel is from the prior frame.

The vector AD represents the movement of the pixel, and the length of AD represents the magnitude of displacement. The magnitude of displacement for each moved pixel for a current frame may be similarly determined.

In an embodiment (used in the illustrative example(s) of sections below as well), the motion energy vectors (square of displacement magnitudes) are computed, and the resulting values normalized on a scale of 0 to 1 (with 1 representing the maximum displacement magnitude). The normalized motion energy vectors are used for further analysis in all the steps described below.

However, it should be appreciated that the displacement magnitudes can be used in other forms (e.g., without normalization and/or using the squares of the values) without departing from the scope and spirit of various aspects of the present invention. In addition, the displacement magnitudes can be computed with respect to a next frame (instead of a prior frame, as otherwise described). The corresponding implementations will be apparent to one skilled in the relevant arts by reading the disclosure provided herein.

5. Identification of Pixels of Interest

In one embodiment, key video frames identification block 150 determines the pixels of interest that have moved substantially compared to corresponding positions in a previous frame. Only such pixels are considered for further analysis in one embodiment.

Figure 4:
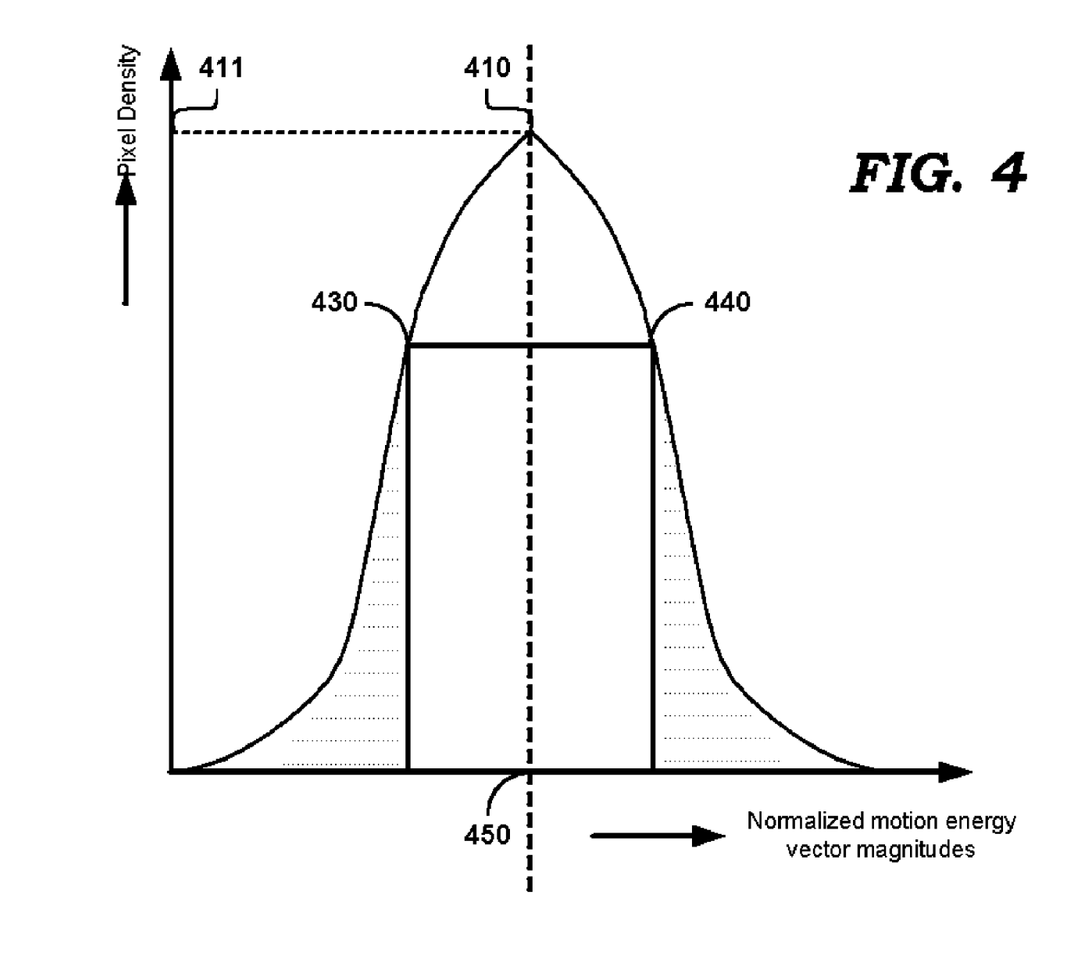
FIG. 4 is a graph illustrating the manner in which active pixels are determined in one embodiment.

FIG. 4 contains a graph illustrating the manner in which pixels of interest can be identified for an example current frame. The X-axis represents the normalized motion energy vector magnitudes (or small range of values) and Y-axis represents the pixel density (the number of occurrence for the corresponding energy vector magnitude).

As shown, the displacement motion energy vector magnitudes follow Guassian distribution in the illustrative example. The peak of the distribution is shown at point 410, having X-coordinate (peak distribution point) of point 450, and Y-coordinate of point 411. The pixels deviating from peak value 450 by more than two times variance are represented by points 430 and 440.

The pixels falling outside the ranges of 430 and 440 are shown represented by dotted areas, and represent the pixels of interest. Only these active pixels may be included in further computations. With reference to step 230, in an embodiment, the average motion vector energy of a frame is computed based on the pixels of interest.

Such computed average may be used to determine the rate of change.

6. Determination of Rate of Change of the Average Displacement Magnitudes

According to an aspect of the present invention, key video frames identification block 150 determines the rate of change (difference of differences) of displacement magnitudes, and the rate is used as one of the parameters in determining whether a video frame is to be treated as a key video frame. The manner in which the rate of change may be computed is described below with reference to FIGS. 5 and 6.

Figure 5:
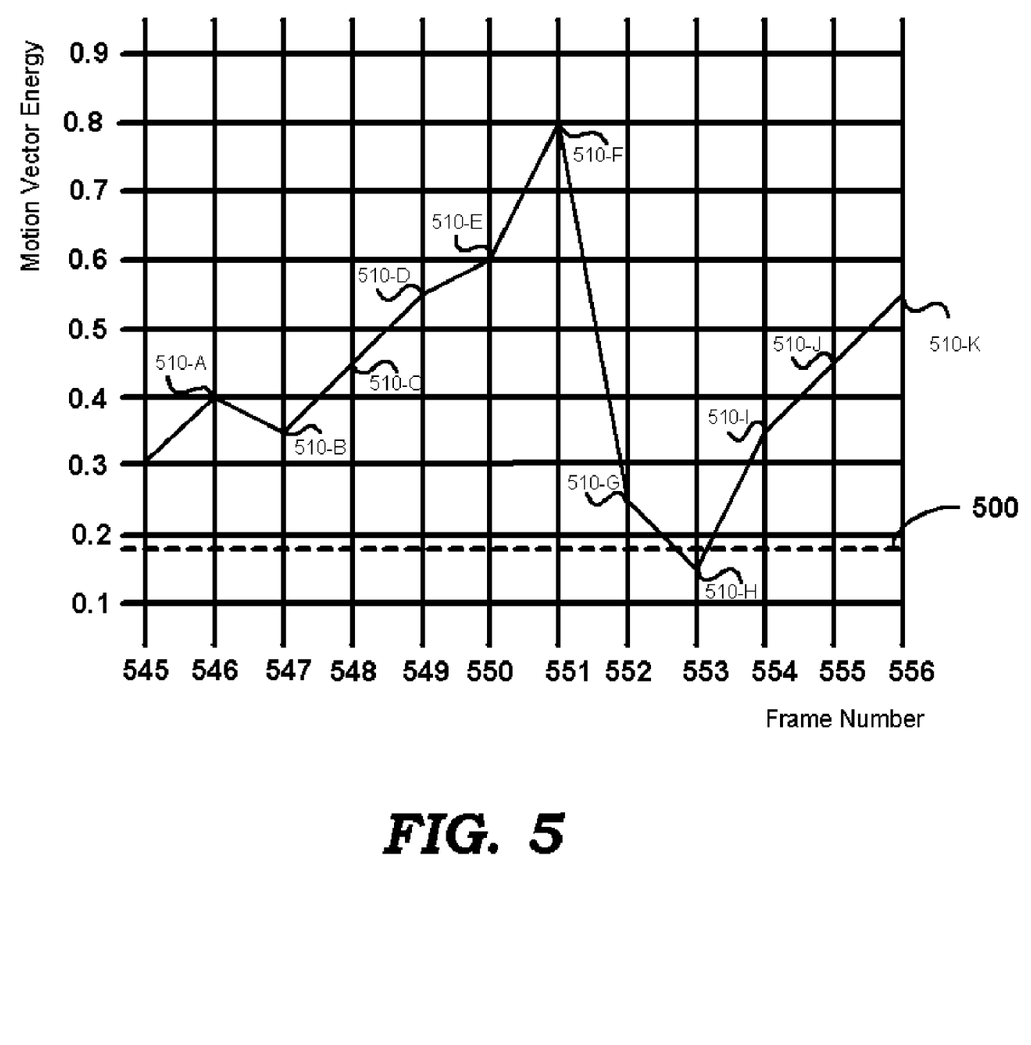
FIG. 5 is a graph illustrating the manner in which the average displacement energy is used in determining key video frames, and the manner in which a threshold used for such determination may be dynamically adjusted in one embodiment of the present invention.

FIG. 5 contains a graph indicating the frame number on X-axis and the corresponding average motion vector energy (computed as the average of the squares of displacement magnitude of pixels of interest) on Y-axis in an example scenario. For ease of representation, the values are selected in resolution of 0.1. Thus frame numbers 545-555 are respectively shown with corresponding motion energy vectors represented by points 510-A through 510-J.

The rate corresponding to each frame 545-555 is computed as the absolute value of a difference of the motion vector energy magnitude of the current frame and that (motion energy vector magnitude) of the previous frame. The corresponding values are shown plotted in FIG. 6. For example, frame 551 is shown having a rate of 0.2 (at point 610-G) equaling a difference of 0.8 (the motion vector energy of current frame 551) and 0.6 (the motion vector energy of prior frame 550).

As noted above with reference to step 250 of FIG. 2, a frame is selected as a key frame if the corresponding motion vector energy and rate exceed corresponding threshold values. The threshold value for motion energy vectors is shown as broken line 500 (in FIG. 5) and the threshold value for rates is shown as broken line 600 (in FIG. 6).

In the illustrative example, with respect to FIG. 5, all frames except frame 553 exceed the threshold value 500, and thus a first set may be viewed as containing all frames except frame 553. With respect to FIG. 6, frames 551, 552 and 554 are shown exceeding the threshold value 600, and a second set may be viewed as containing frames 551, 552 and 554. The intersection of the two sets (i.e., frames 551, 552 and 554) are determined to be key frames.

As may be readily observed, the number of frames considered as key frames are reduced due to the use of rate of change of motion vector energy as described above with reference to FIG. 6. In addition, it should be appreciated that the above-described approach of computing rate of change of visual content is merely illustrative. Various other approaches of computing the rate of change of visual content will be apparent to one skilled in the relevant arts by reading the disclosure herein. It may be noted that the rate of change of the rates may also be referred to as a rate. The corresponding implementations are contemplated to be covered by the scope and spirit of various aspects of the present invention.

Another aspect of the present invention ensures that an optimum number of frames are selected as key video frames, as described below in further detail with an example.

7. Dynamic Thresholds

Figure 6:
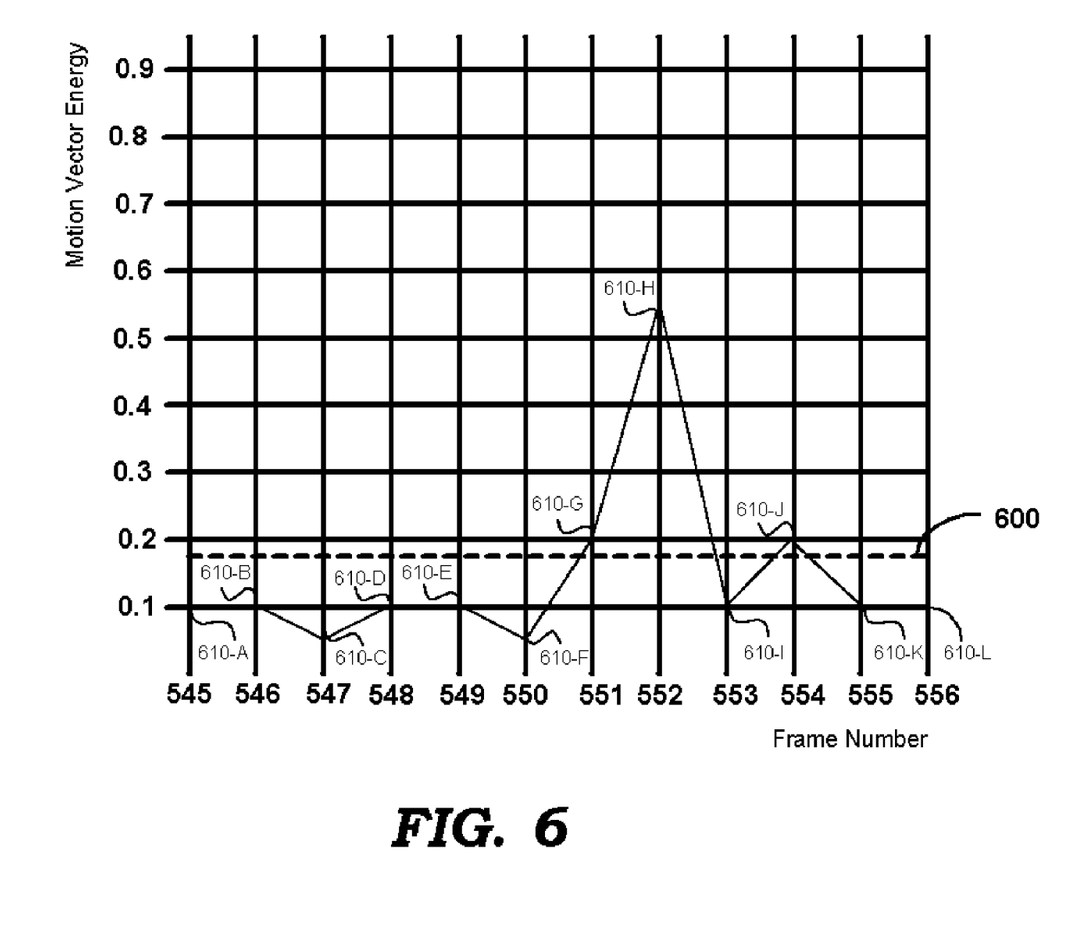
FIG. 6 is a graph illustrating the manner in which the rate of change of average displacement energy is used in determining key video frames, and the manner in which a threshold used for such determination may be dynamically adjusted in one embodiment of the present invention.

According to an aspect of the present invention, key video frames identification block 150 adjusts thresholds 500 and 600 dynamically to ensure that at least a (optimum) desired number of frames are determined to be key video frames with a specified duration. In an embodiment, the specified duration is translated into a number of successive frames, and the respective number of frames exceeding thresholds 500 and 600 is counted. For purpose of illustration, it is assumed that a first number of frames exceeds threshold 500 and a second number of frames exceeds threshold 600.

If the first number falls below a desired number, threshold 500 is lowered. If the first number exceeds another desired number, threshold 500 is increased. Similar considerations are applied to lower or increase threshold 600 as well. By adjusting the thresholds adaptively and dynamically using such approaches, key video frames identification block 150 may ensure that sufficient number of frames are determined to be key video frames. The operation of various aspects of the present invention in an example scenario are described below with reference to FIGS. 7A and 7B

8. Operation in an Example Scenario

Figure 7:
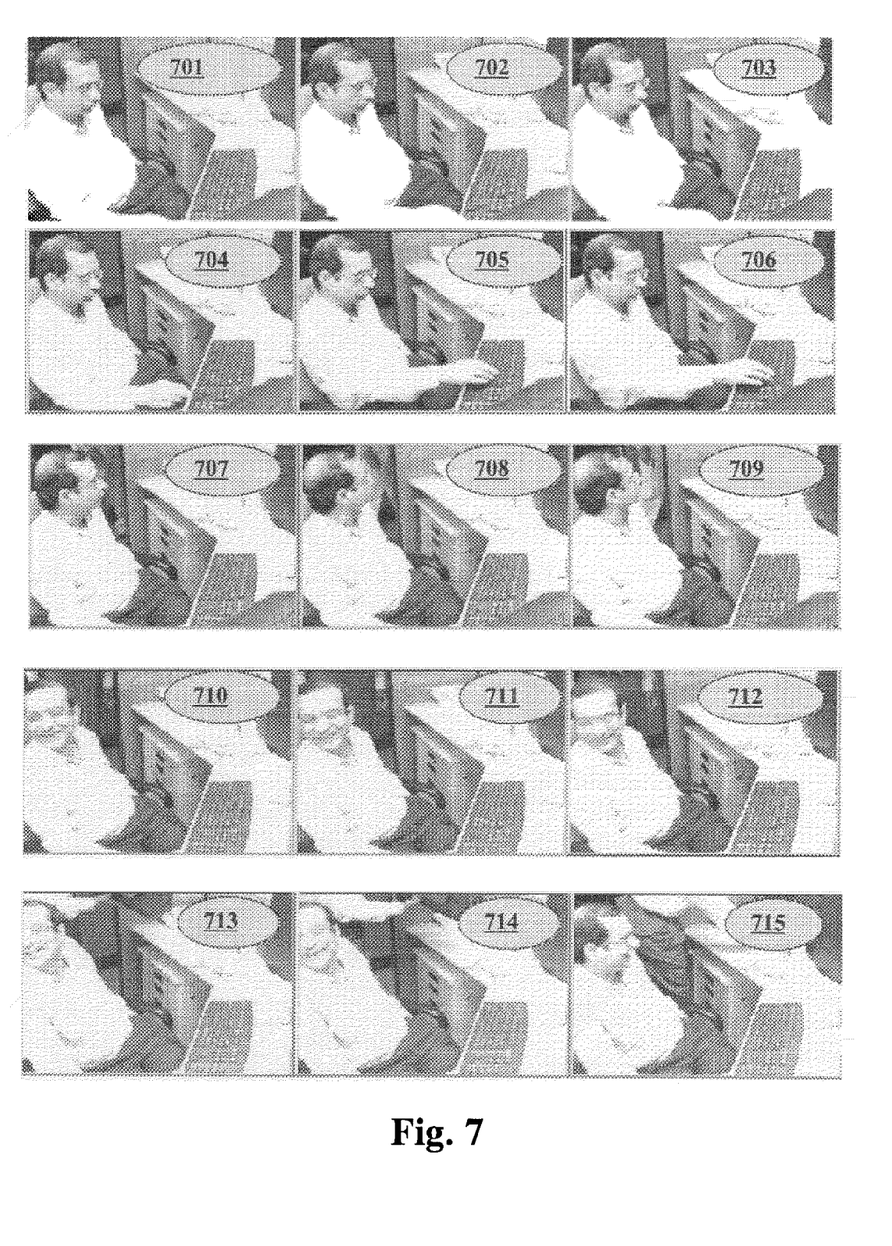
FIG. 7 depicts example frames which are processed in an example embodiment.

FIG. 7 contains 15 frames (numbered 701-715 respectively) captured from a scene in which a person is present. Frames 701, 702, 703 represent low activity low motion frames. In frames 704, 705, and 706, the person is shown lifting his hand, representing increased activity and significant motion. In frames 707, 708 and 709, the person is shown changing focus of attention towards his left, representing changed activity, but with medium foreground motion.

In frames 710, 711 and 712, the person is shown turning to his right, representing change in activity, but with large foreground motion. In frames 713, 714, and 715 the person is shown continuing to laugh and another person enters the scene to pick some object from the table, representinmg changed background activity and large background motion. The manner in which the frames may be processed in an embodiment of the present invention is represented by the graph of FIG. 8.

Figure 8:
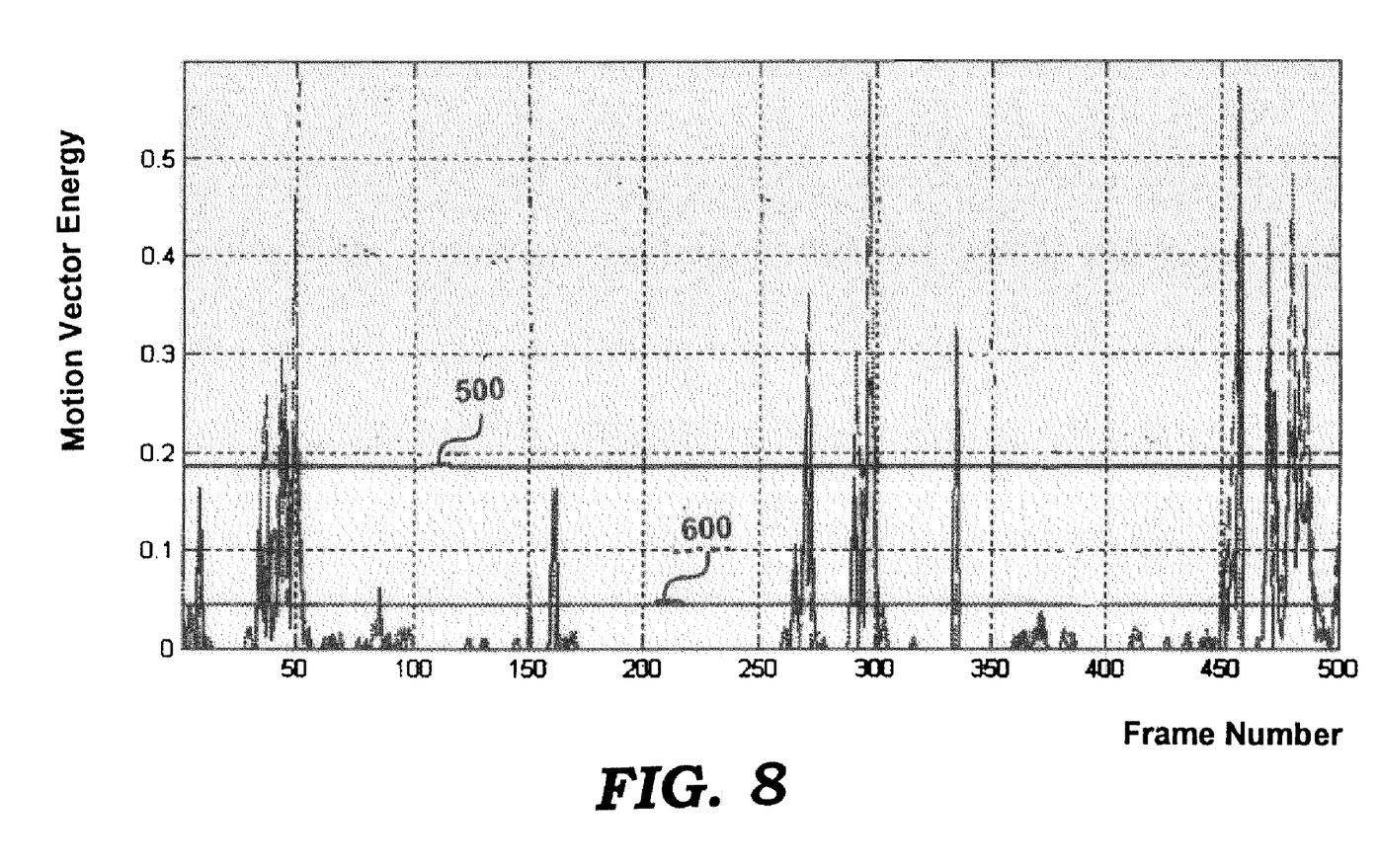
FIG. 8 is a graph illustrating the manner in which some of the frames are selected as key video frames in an example embodiment.

The graph of FIG. 8 contains frame numbers (0-500) on X-axis and the normalized motion energy vector on the Y-axis. The threshold used with the motion energy vector in selection of key frames is shown as horizontal line 810 and the threshold used with the slope is shown as horizontal line 820. The frames of FIG. 7 are indicated at different frame numbers of FIG. 8. Thus, frames 701, 702, and 703 of FIG. 7 are shown close to frame number 0 of FIG. 8, and represent non-key frames. Frames 704, 705 and 706 of FIG. 7 are shown around frame 50 of FIG. 8, and represent key video frames. Frames 710, 711 and 712 of FIG. 7 are shown around frame 450 of FIG. 8, and represent key video frames. Frames 713, 714 and 715 of FIG. 7 are shown around frame 475, and represent key video frames.

The key frames thus identified and various related features may be displayed using a suitable user interface. An example user interface is described below in further detail.

9. User Interface

Figure 9:
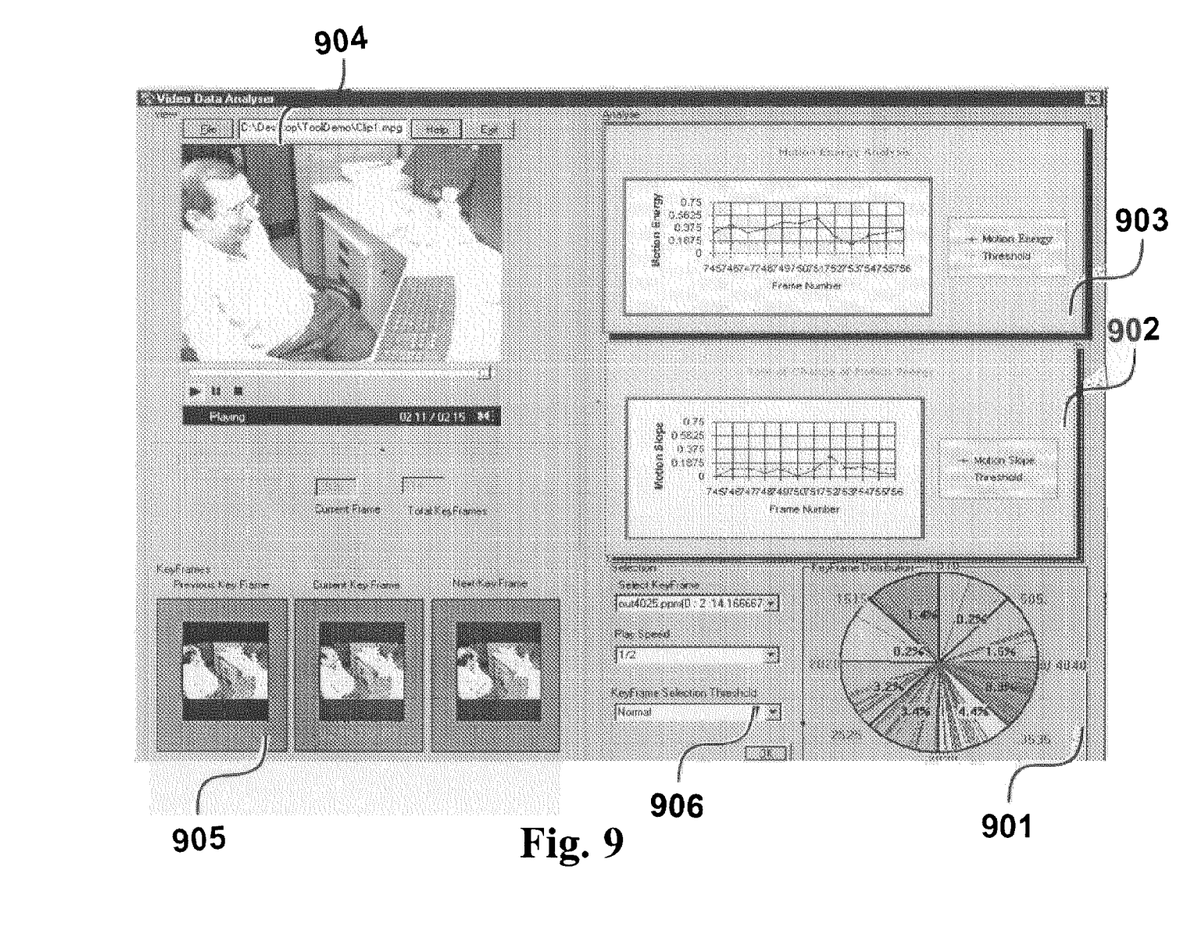
FIG. 9 is a snap-shot of a computer display illustrating an example user interface provided according to an aspect of the present invention.

FIG. 9 contains a snap-shot of a screen illustrating an example user interface provided by video interface display 140 in one embodiment. The screen is shown broadly containing six portions 901-906, and each portion is described below in further detail.

Portion 901 displays the key frames in the form of a pie-chart. Broadly, the entire circle represents all the frames considered for analysis, and the specific frames identified as key frames are high-lighted. In the Figure, it is assumed that there are a total of 1040 frames, and accordingly the 360 degree angle is divided into 1040 successive lines, with the lines representing key frames being high-lighted. Thus, the pie chart represents a display which indicates the manner in which key video frames are interspersed in the analyzed sequence of frames. A user may click on a highlighted line and view the corresponding key frame in portion 904.

Portion 904 displays a current frame. A user may select pause, play or stop buttons below the displayed frame to pause (suspend) the current frame, continue to sequentially view the images from the current frame, or to stop display. Portion 905 displays the previous, current and next key frames based on selection performed earlier (and stored in key video frames storage 130).

Portions 902 and 903 respectively display information similar to the graphs of FIGS. 5 and 6.

Portion 906 is shown containing three buttons, with the first button 921 enabling a user to select one of the key frames. The selected key frame may be immediately selected in portion 905. Second button 922 may enable a user to select the play speed, which controls the speed at which the images are displayed in portion 904. Third button may enable a user to specify the threshold as normal, high or low. In general, a higher threshold leads to fewer frames being selected as key frames.

Thus, the interface shown in FIG. 9 can be used by a user to view the captured frames as well as the key video frames. The description is continued with respect to an embodiment of key video frames identification block 150, which is controlled by software instructions as described below.

10. Software-driven Implementation

Figure 10:
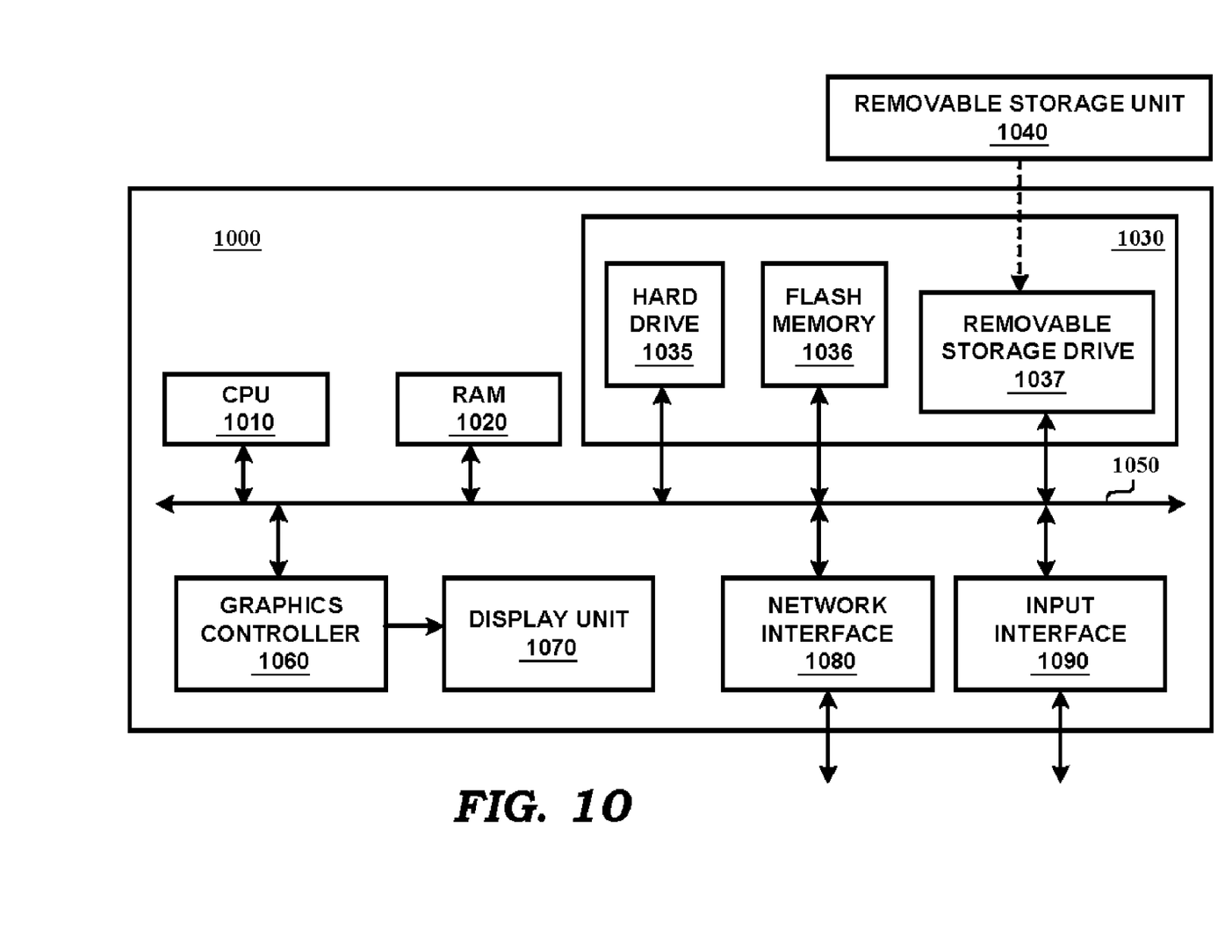
FIG. 10 is a block diagram illustrating the manner in which various aspects of the present invention can be implemented substantially in the form of software instructions.

FIG. 10 is a block diagram illustrating the details of digital processing system 1000 implemented substantially in the form of software in an embodiment of the present invention. System 1000 may be used to implement a portion of key video frames identification block 150 and/or video interface display 140. System 1000 may contain one or more processors such as central processing unit (CPU) 1010, random access memory (RAM) 1020, secondary memory 1030, graphics controller 1060, display unit 1070, network interface 1080, and input interface 1090. All the components except display unit 1070 may communicate with each other over communication path 1050, which may contain several buses as is well known in the relevant arts. The components of FIG. 10 are described below in further detail.

CPU 1010 may execute instructions stored in RAM 1020 to provide several features of the present invention. For example, the key video frames may be determined due to such execution. CPU 1010 may contain multiple processing units, with each processing unit potentially being designed for a specific task. Alternatively, CPU 1010 may contain only a single general purpose processing unit. RAM 1020 may receive instructions from secondary memory 1030 using communication path 1050.

Graphics controller 1060 generates display signals (e.g., in RGB format) to display unit 1070 based on data/instructions received from CPU 1010. Display unit 1070 contains a display screen to display the images defined by the display signals. Input interface 1090 may correspond to a key-board and/or mouse. Graphics controller 1060 and input interface 1090 may enable an user to view various key video frames or the sequence of captured frames.

Secondary memory 1030 may contain hard drive 1035, flash memory 1036 and removable storage drive 1037. Secondary memory 1030 may store the data and software instructions, which enable system 1000 to provide several features in accordance with the present invention. Some or all of the data and instructions may be provided on removable storage unit 1040, and the data and instructions may be read and provided by removable storage drive 1037 to CPU 1010. Floppy drive, magnetic tape drive, CD-ROM drive, DVD Drive, Flash memory, removable memory chip (PCMCIA Card, EPROM) are examples of such removable storage drive 1037.

Removable storage unit 1040 may be implemented using medium and storage format compatible with removable storage drive 1037 such that removable storage drive 1037 can read the data and instructions. Thus, removable storage unit 1040 includes a computer readable storage medium having stored therein computer software and/or data.

In this document, the term "computer program product" is used to generally refer to removable storage unit 1040 or hard disk installed in hard drive 1035. These computer program products are means for providing software to system 1000.

CPU 1010 may retrieve the software instructions, and execute the instructions to provide various features of the present invention as described above.

11. Conclusion

While various embodiments of the present invention have been described above, it should be understood that they have been presented by way of example only, and not limitation. Thus, the breadth and scope of the present invention should not be limited by any of the above-described example embodiments, but should be defined only in accordance with the following claims and their equivalents.

The invention claimed is:

1. A method of identifying a plurality of key video frames in a sequence of image frames, each of said sequence of image frames containing a plurality of pixels, each of said plurality of pixels corresponding to a corresponding point of an area based on which said sequence of image frames are generated, said method comprising:

using a processor to determine a rate of change of visual content of each current frame from a corresponding reference frame, each of said current frame and said reference frame being comprised in said sequence of image frames, wherein said rate of change represents a difference of a first value and a second value, said first value representing a change of visual content of a current frame compared to a first frame, said second value representing a change of visual content of said first frame compared to a second frame, wherein said second frame is a reference frame for said first frame and said first frame is a reference frame for said current frame; and using the processor to select said current frame as a corresponding one of a set of potential video frames if said rate exceeds a corresponding first threshold value, wherein said plurality of key video frames are selected from said set of potential video frames, wherein said determining and said selecting are repeated for each of said sequence of image frames as said current frame to form said set of potential video frames, wherein each of the respective first frame and the respective second frame are different for different ones of the current frame in said sequence of image frames;

wherein said determining comprises:

determining a displacement magnitude of each moved pixel of said current frame compared to the position in said first frame and of said first frame compared to the position in said second frame; and computing a first representative magnitude of said displacement magnitude for said moved pixels of said current frame compared to said first frame, and a second representative magnitude of said displacement magnitude for said moved pixels of said first frame compared to said second frame, wherein said first value and said second value respectively equal said first representative magnitude and said second representative magnitude such that said rate is computed as a difference of said first representative magnitude and said second representative magnitude.

2. The method of claim 1, wherein said first representative magnitude for said current frame equals an average of motion energy vector magnitudes of said moved pixels of said current frame in comparison with corresponding pixels of said first frame.

3. The method of claim 2, wherein said first threshold value is the same for all of said current frames, said selecting further comprises:

including said current frame in said set of potential video frames only if said first representative magnitude exceeds a second threshold; and including only those of said set of potential video frames, which exceed said first threshold, in said plurality of key video frames.

4. The method of claim 3, wherein said first threshold and said second threshold are adjusted dynamically to ensure that a desired number of frames are selected as key video frames in a specified duration.

5. The method of claim 3, further comprising identifying a plurality of active pixels in said current frame, wherein a pixel is considered an active pixel if a corresponding displacement magnitude is outside of a range, wherein only said plurality of active pixels are used by said computing.

6. The method of claim 5, wherein said range set by a distance of two times the variance from the mean of a distribution.

7. The method of claim 5, wherein said first representative magnitude comprises an average of said active pixels.

8. The method of claim 5, further comprising:

enabling a user to specify one of a plurality of key video frames, wherein said plurality of key video frames are selected by said selecting; and displaying said specified one of said plurality of key video frames.

9. The method of claim 8, further comprising:

displaying a prior key video frame and a next key video frame in relation to said specified one of said plurality of key video frames, wherein said prior key video frame and said next key video frame are comprised in said plurality of key video frames.

10. The method of claim 9, further comprising:

generating a display indicating the manner in which said plurality of key video frames are interspersed in said sequence of image frames, wherein said enabling is based on said display.

11. The method of claim 10, wherein said display comprises a pie chart.

12. The method of claim 9, further comprising:

generating a display listing said plurality of key video frames, wherein said enabling is based on said display.

13. The method of claim 1, wherein the corresponding first frame and the corresponding second frame are selected at a same respective relative position in comparison to the position of the current frame such that each of the respective first frame and the respective second frame are different for different current frame.

14. The method of claim 13, wherein said current frame, said first frame and said second frame are in consecutive successive positions in said sequence of frames.

15. A computer readable medium storing one or more sequences of instructions for causing a processing system to identify key video frames in a sequence of image frames, each of said sequence of image frames containing a plurality of pixels, each of said plurality of pixels corresponding to a corresponding point of an area based on which said sequence of image frames are generated, wherein execution of said one or more sequences of instructions by one or more processors contained in said processing system causes said one or more processors to perform the actions of:

determining a rate of change of visual content of each current frame from a corresponding reference frame, each of said current frame and said reference frame being comprised in said sequence of image frames, wherein said rate of change represents a difference of a first value and a second value, said first value representing a change of visual content of a current frame compared to a first frame, said second value representing a change of visual content of said first frame compared to a second frame, wherein said second frame is a reference frame for said first frame and said first frame is a reference frame for said current frame; and selecting said current frame as a key video frame if said rate exceeds a first threshold value;

wherein said determining comprises:

determining a displacement magnitude of each moved pixel of said current frame compared to the position in said first frame and of said first frame compared to the position in said second frame; and computing a first representative magnitude of said displacement magnitude for said moved pixels of said current frame compared to said first frame, and a second representative magnitude of said displacement magnitude for said moved pixels of said first frame compared to said second frame, wherein said first value and said second value respectively equal said first representative magnitude and said second representative magnitude such that said rate is computed as a difference of said first representative magnitude and said second representative magnitude.

16. The computer readable medium of claim 15, wherein said first representative magnitude for said current frame equals an average of motion energy vector magnitudes of said moved pixels of said current frame in comparison with corresponding pixels of said first frame.

17. The computer readable medium of claim 16, wherein said current frame is selected as said key video frame only if said first representative magnitude exceeds a second threshold.

18. The computer readable medium of claim 17, wherein said first threshold and said second threshold are adjusted dynamically to ensure that a desired number of frames are selected as key video frames in a specified duration.

19. The computer readable medium of claim 17, further comprising identifying a plurality of active pixels in said current frame, wherein a pixel is considered an active pixel if a corresponding displacement magnitude is outside of a range, wherein only said plurality of active pixels are used by said computing.

20. The computer readable medium of claim 19, wherein said range set by a distance of two times the variance from the mean of a distribution.

21. A digital processing system identifying key video frames in a sequence of image frames, each of said sequence of image frames containing a plurality of pixels, each of said plurality of pixels corresponding to a corresponding point of an area based on which said sequence of image frames are generated, said digital processing system comprising:

processor means for determining a rate of change of visual content of each current frame from a corresponding reference frame, each of said current frame and said reference frame being comprised in said sequence of image frames, wherein said rate of change represents a difference of a first value and a second value, said first value representing a change of visual content of a current frame compared to a first frame, said second value representing a change of visual content of said first frame compared to a second frame, wherein said second frame is a reference frame for said first frame and said first frame is a reference frame for said current frame; and processor means for selecting said current frame as a key video frame if said rate exceeds a first threshold value;

wherein said means for determining is operable to:

determine a displacement magnitude of each moved pixel of said current frame compared to the position in said reference first frame and of said first frame compared to the position in said second frame; and compute a first representative magnitude of said displacement magnitude for said moved pixels of said current frame compared to said first frame, and a second representative magnitude of said displacement magnitude for said moved pixels of said first frame compared to said second frame, wherein said first value and said second value respectively equal said first representative magnitude and said second representative magnitude such that said rate is computed as a difference of said first representative magnitude and said second representative magnitude.

22. The digital processing system of claim 21, wherein said first representative magnitude for said current frame equals an average of motion energy vector magnitude of said moved pixels of said current frame in comparison with corresponding pixels of said first frame.

23. The digital processing system of claim 22, wherein said current frame is selected as said key video frame only if said first representative magnitude exceeds a second threshold.

24. The digital processing system of claim 23, wherein said first threshold and said second threshold are adjusted dynamically to ensure that a desired number of frames are selected as key video frames in a specified duration.

25. A method of identifying a plurality of key video frames in a sequence of image frames, each of said sequence of image frames containing a plurality of pixels, each of said plurality of pixels corresponding to a corresponding point of an area based on which said sequence of image frames are generated, said method comprising:

using a processor to receive said sequence of frames of a same scene/area of interest according to a sequential order;

using the processor to choose one of said sequence of image frames as a current frame, a first frame being before said current frame and a second frame being before said first frame according to said sequential order, said first frame being at a first relative position in relation to said first frame in said sequential order and said second frame being at a second relative position in relation to said first frame in said sequential order;

using the processor to calculate a displacement magnitude difference of a first value and a second value, said first value representing a measure of a displacement magnitude change of visual content of said current frame compared to said first frame, and said second value representing a measure of a displacement magnitude change of visual content of said first frame compared to a second frame;

using the processor to select said current frame as a corresponding one of said plurality of key video frames if said difference exceeds a first threshold value and first value exceeds a second threshold value; and using the processor to repeat said calculating and said selecting after choosing each of said sequence of image frames as said current frame to form said plurality of key video frames, wherein each of the respective first frame and the respective second frame are different for different ones of the current frames, and are respectively determined based on the same first relative position and said second relative position in reference to the corresponding current frame.

26. A method of identifying a plurality of key video frames in a sequence of image frames comprising:

receiving into a computer processor a plurality of image frames;

calculating displacement values between pixels of interest in a first frame and a second frame, and displacement values between the pixels of interest in the second frame and a third frame;

squaring the displacement values;

averaging the squares of the displacement values;

calculating a rate of change between the second frame and the third frame by determining an absolute value between the averaged squares of the displacement values for the second frame and third frame; and identifying a key video frame by comparing the averaged squares of the displacement values to a first threshold, and by comparing the rate of change to a second threshold.

27. The method of claim 26, wherein the first threshold is equal to the second threshold.

* * * * *